(No Model.)
M. B. DODGE.
SEPARATOR FOR WET ORES.
No. 279,641. Patented June 19, 1883.
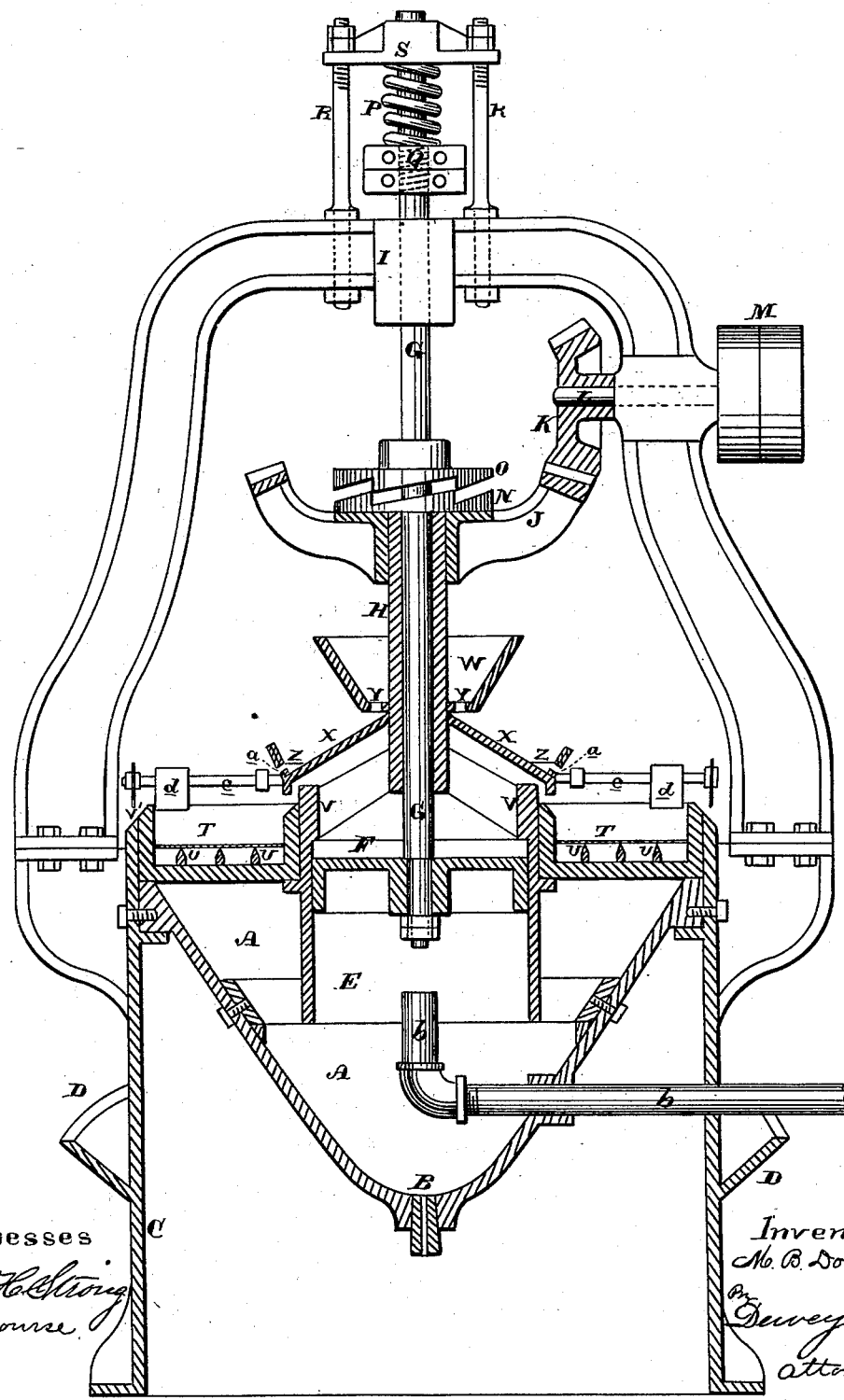
Witnesses
Geo. H. Strong
Jos. Rouse
Inventor
M. B. Dodge
by Dewey & Co.
Attorneys

United States Patent Office.

MILES B. DODGE, OF SAN FRANCISCO, CALIFORNIA.

SEPARATOR FOR WET ORES.

SPECIFICATION forming part of Letters Patent No. 279,641, dated June 19, 1883.

Application filed October 10, 1882. (No model.)

*To all whom it may concern:*

Be it known that I, MILES B. DODGE, of the city and county of San Francisco, State of California, have invented an Improved Separator for Wet Ores; and I hereby declare the following to be a full, clear, and exact description thereof.

My invention relates to an apparatus for the concentration of valuable metals and sulphurets and their separation from the gangue of their ores when the latter have been crushed or treated by wet processes. The invention consists in the construction and arrangement of a conical water-pan, a centrally-placed cylinder and piston, a surrounding screen to receive the ore, and novel feeding and distributing devices, all operated by a connected mechanism; and, further, in peculiar details of construction, to be hereinafter fully described and claimed.

The apparatus in general consists of a conical pan or receptacle having a cylinder supported centrally and above the bottom, and around this cylinder a horizontal screen extending across the top of the pan, with flanges or rims extending a short distance above it. Within the cylinder a plunger moves vertically, being operated by suitable mechanism, and water is admitted into the pan from below, filling it, so that the sudden downward movement of the plunger will force the water up through the screen and lift the body of ore upon it, so that the heavier, valuable particles will settle through the screen, while the lighter material will be kept at the top and will run off over the outer rim when it has reached a sufficient height, being assisted by revolving plows or scrapers which travel just inside the rim. The material is fed into a hopper surrounding the central shaft, having holes in the bottom which discharge upon a conical distributer, at the bottom of which are openings to allow the material to pass through upon the screen as the distributer revolves.

Referring to the accompanying drawing for a more complete explanation of my invention, the figure is a vertical section of my apparatus.

A is a pan or vessel of any suitable size and dimensions. In the present case I have shown it as conical in shape or narrowing toward the bottom, so that the concentrations may settle to the discharge-opening B in the center. The pan proper is shown to be supported by a cylinder, C, of suitable height, having an inclined or spiral trough or sluice, D, around the outside to receive the wash material as it passes out over the rim and carry it away. Within the pan, and near the top, is a cylinder, E, supported centrally and having a piston or plunger, F, which moves vertically in the cylinder, being actuated by a stem or rod, G, which extends upward through a sleeve, H, and a guiding-yoke, I, at the top, as shown. The sleeve H carries a bevel-gear wheel, J, which is engaged by a driving-pinion, K, upon the shaft L. The whole is driven by a belt through pulleys M.

Upon the top of the horizontal bevel-wheel J is fixed a disk, N, having inclined teeth upon its upper side. A similar disk, O, is keyed to the piston-rod G just above the disk N, having inclined teeth upon its lower side. When the wheel J and the disk N, secured to it, are revolved against the inclined faces of the disk O, which, as before stated, is keyed to the piston-rod, the disk O and piston will be elevated against the pressure of the spring P to the position shown in the figure until the vertical adjacent sides of the teeth of the respective disks have passed each other, when the piston-rod will fall and the disk O will drop into engagement with the disk N. The tension of this spring may be regulated by adjusting-nuts upon the screw-rods R, acting upon the bar S, which presses upon the upper end of the spring.

A wire screen, T, surrounds the cylinder E and covers the space between it and the edge of the pan A. This screen is supported upon the edges of the bars U, to which it may be secured by small staples, and it is thus held in place between an inner rim, V, formed by the upper edge of the cylinder E, and an outer rim, V', slightly lower than the former, formed by the upper edge of the main cylinder C.

Surrounding the sleeve H, and rotating with it, is a hopper, W, into which the material to be treated is fed and discharged thence upon a diverging distributing-cone, X, just below the hopper. Holes Y in the bottom of the hopper allow the material to escape upon the cone and flow down its surface to the channel Z, around its base, whence it flows out through the openings a upon the screen, being distributed all around upon the screen by the rotation of the hopper and the cone.

The operation is as follows: The screen-bed T being properly supplied with ore, and water being admitted into the pan through the supply-pipe b until it is full, the machine is set in motion, when the piston F will be lifted by the inclined teeth or cams upon the disks N and O, and will be forced suddenly downward by the action of the spring P as often as it is raised and released from the cam, thus forcing the water up through the screen T among the ore upon its surface. The effect of this intermittent rush of water through the screen is to cause the lighter portions to rise to the top and eventually flow over the outer rim, V', into the waste-chute D, and through it to any desired point of discharge. The heavier particles will settle upon and through the screen T into the water in the pan A, and, flowing down its sides, will reach the escape or discharge opening B, through which they may pass constantly or at intervals, as desired, and be collected below. If the opening B is constantly open, it will not discharge the water as fast as it is supplied by the larger pipe, b. Arms c project from the lower part of the distributing-cone X, and are carried around by it. Upon their outer ends are fixed plows or scrapers d, which assist in discharging the waste material over the outer edge of the screen. The stroke of the piston is regulated by screwing the collars Q up or down upon the piston-rod.

Having thus described my invention, what I claim as new, and desire to secure by Letters Patent, is—

1. The pan A, the screen T, the cylinder E, and the piston F, in combination with the piston-rod G, the cams or inclines N O, and the spring P, substantially as described.

2. The pan A, the horizontal screen T, the cylinder E, vertically-reciprocating piston F and its actuating mechanism, in combination with the rotary hopper W and the distributing-cone X, by which the ore supply upon the screen is equalized, substantially as described.

3. In an ore-separator, the water-containing pan A, the horizontal screen T, the cylinder E, and the piston F, in combination with the rotary hopper W, the cone X, and the plows or scrapers d, substantially as described.

In witness whereof I hereunto set my hand.

MILES B. DODGE.

Witnesses:
S. H. NOURSE,
G. W. EMERSON.